US012795057B2

(12) United States Patent
Fujiwara

(10) Patent No.: US 12,795,057 B2
(45) Date of Patent: *Nov. 10, 2026

(54) VIDEO CONTROL DEVICE, VIDEO RECORDING DEVICE, VIDEO CONTROL METHOD, VIDEO RECORDING METHOD, AND VIDEO CONTROL PROGRAM

(71) Applicant: FUJIFILM Corporation, Tokyo (JP)

(72) Inventor: Shinya Fujiwara, Saitama (JP)

(73) Assignee: FUJIFILM Corporation, Toko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/057,890

(22) Filed: Feb. 19, 2025

(65) Prior Publication Data

US 2025/0193356 A1 Jun. 12, 2025

Related U.S. Application Data

(63) Continuation of application No. 18/057,227, filed on Nov. 21, 2022, now Pat. No. 12,262,157, which is a (Continued)

(30) Foreign Application Priority Data

Jun. 26, 2020 (JP) ................................ 2020-110766

(51) Int. Cl.
*H04N 9/79* (2006.01)
*H04N 5/765* (2006.01)
*H04N 23/72* (2023.01)

(52) U.S. Cl.
CPC ........... *H04N 9/7921* (2013.01); *H04N 5/765* (2013.01); *H04N 9/7908* (2013.01); *H04N 23/72* (2023.01)

(58) Field of Classification Search
CPC .... H04N 9/7921; H04N 5/765; H04N 9/7908; H04N 23/72; H04N 23/76; G03B 7/00
(Continued)

(56) References Cited

U.S. PATENT DOCUMENTS 5,220,312 A 6/1993 Lumelsky et al.
5,325,216 A 6/1994 AuYeung
(Continued)

FOREIGN PATENT DOCUMENTS

CN 104365082 2/2015
CN 106134179 11/2016
(Continued)

OTHER PUBLICATIONS

"Notice of Reasons for Refusal of Japan Counterpart Application", issued on Dec. 2, 2025, with English translation thereof, pp. 1-14.
(Continued)

*Primary Examiner* — Helen Shibru
(74) *Attorney, Agent, or Firm* — JCIPRNET

(57) ABSTRACT

A transitory storage unit temporarily stores pixel data output from an imaging unit. A development processing unit outputs video data obtained by performing development processing including demosaicing processing on the pixel data stored in the transitory storage unit. An output control unit switches between a first recording mode in which only the video data out of the video data and the pixel data is used as recording data and a second recording mode in which the video data and the pixel data are used as the recording data. In addition, the output control unit controls the imaging unit to perform imaging with different exposure values between the first recording mode and the second recording mode.

6 Claims, 11 Drawing Sheets

Related U.S. Application Data continuation of application No. PCT/JP2021/018395, filed on May 14, 2021.

(58) Field of Classification Search
USPC .......................................................... 386/200
See application file for complete search history.

(56) References Cited

U.S. PATENT DOCUMENTS

| | | | | |
|---|---|---|---|---|
| 5,473,342 | A | 12/1995 | Tse et al. | |
| 5,959,669 | A * | 9/1999 | Mizoguchi ........... | H04N 23/631 348/E5.025 |
| 5,973,742 | A | 10/1999 | Gardyne et al. | |
| 7,050,703 | B2 | 5/2006 | Ohta et al. | |
| 7,088,369 | B2 | 8/2006 | Champion et al. | |
| 7,426,341 | B2 | 9/2008 | Misawa | |
| 8,194,164 | B2 * | 6/2012 | Border ................. | H04N 25/589 348/311 |
| 8,345,130 | B2 | 1/2013 | Adams, Jr. et al. | |
| 8,351,516 | B2 | 1/2013 | Ejima | |
| 8,908,065 | B2 | 12/2014 | Oike | |
| 9,270,894 | B2 | 2/2016 | Yamamoto et al. | |
| 9,392,169 | B2 | 7/2016 | Wada | |
| 9,485,435 | B2 | 11/2016 | Huang | |
| 9,686,503 | B2 * | 6/2017 | Endo .................... | H04N 13/139 |
| 9,727,947 | B2 * | 8/2017 | Koskinen .............. | G06T 3/4015 |
| 10,762,827 | B2 | 9/2020 | Nakao et al. | |
| 10,951,888 | B2 * | 3/2021 | Kiser ..................... | H04N 23/45 |
| 11,196,959 | B2 * | 12/2021 | Nakamura ............. | H04N 5/907 |
| 11,778,340 | B2 * | 10/2023 | Zhao .................. | A61B 1/00006 348/68 |
| 2005/0247858 | A1 | 11/2005 | Misawa | |
| 2007/0132878 | A1 | 6/2007 | Tanaka | |
| 2011/0211127 | A1 | 9/2011 | Kelvin | |
| 2013/0319992 | A1 | 12/2013 | Meusburger | |
| 2015/0022703 | A1 | 1/2015 | Oike | |
| 2015/0077603 | A1 | 3/2015 | Matsuzawa et al. | |
| 2017/0134648 | A1 | 5/2017 | Awatani | |
| 2017/0200283 | A1 | 7/2017 | Yamaguchi | |

FOREIGN PATENT DOCUMENTS

| | | |
|---|---|---|
| JP | 2005117369 | 4/2005 |
| JP | 2005323162 | 11/2005 |
| JP | 2006197243 | 7/2006 |
| JP | 2007166193 | 6/2007 |
| JP | 2007195038 | 8/2007 |
| JP | 2008103979 | 5/2008 |
| JP | 2008306743 | 12/2008 |
| JP | 2010021710 | 1/2010 |
| JP | 2012129611 | 7/2012 |
| JP | 2015119403 | 6/2015 |
| JP | 2017028466 | 2/2017 |
| JP | 2017092636 | 5/2017 |
| JP | 2017126979 | 7/2017 |
| JP | 2020022004 | 2/2020 |
| JP | 2020141297 | 9/2020 |

OTHER PUBLICATIONS

"International Search Report (Form PCT/ISA/210) of PCT/JP2021/018395," mailed on Aug. 3, 2021, with English translation thereof, pp. 1-5.
"Written Opinion of the International Searching Authority (Form PCT/ISA/237) of PCT/JP2021/018395," mailed on Aug. 3, 2021, with English translation thereof, pp. 1-8.
"Office Action of Japan Counterpart Application", issued on Dec. 5, 2023, with English translation thereof, p. 1- p. 5.
"Office Action of Japan Counterpart Application", issued on Feb. 20, 2024, with English translation thereof, p. 1-p. 7.
"Office Action of US Counterpart Application" , issued on May 21, 2024, p. 1-p. 22.
"Notice of Allowance of US Counterpart Application" , issued on Nov. 20, 2024, p. 1-p. 6.
"Office Action of China Counterpart Application", issued on Feb. 14, 2026, with English translation thereof, p. 1-p. 19.

* cited by examiner

VIDEO CONTROL DEVICE, VIDEO RECORDING DEVICE, VIDEO CONTROL METHOD, VIDEO RECORDING METHOD, AND VIDEO CONTROL PROGRAM

CROSS-REFERENCE TO RELATED APPLICATIONS

This application is a continuation application of and claims the priority benefit of U.S. patent application Ser. No. 18/057,227, filed on Nov. 21, 2022, now allowed, which is a Continuation of PCT International Application No. PCT/JP2021/018395 filed on May 14, 2021, which claims priority under 35 U.S.C § 119 (a) to Japanese Patent Application No. 2020-110766 filed on Jun. 26, 2020. Each of the above application(s) is hereby expressly incorporated by reference, in its entirety, into the present application.

BACKGROUND OF THE INVENTION

1. Field of the Invention

The present invention relates to a video control device, a video recording device, a video control method, a video recording method, and a non-transitory computer readable recording medium storing a video control program.

2. Description of the Related Art

JP2007-166193A discloses a camera system having a recording mode in which RAW data and YC data for a thumbnail image converted from the RAW data are stored.

JP2017-28466A discloses an imaging apparatus that starts recording a RAW video while continuing to record a full high definition (Full HD) video in a case in which a user presses a RAW video recording start button during recording of the Full HD video.

JP2010-21710A discloses an imaging apparatus that switches between a first mode in which a video file of a digital development image is recorded together with RAW data of an image and a second mode in which the digital development image is recorded.

SUMMARY OF THE INVENTION

One embodiment according to the technology of the present disclosure provides a video control device, a video recording device, a video control method, a video recording method, and a non-transitory computer readable recording medium storing a video control program capable of performing imaging with an appropriate exposure value depending on whether or not pixel data before demosaicing processing is recorded.

An embodiment according to the technology of the present disclosure relates to a video control device comprising a storage unit that temporarily stores pixel data output from an imaging unit, a development processing unit that outputs video data obtained by performing development processing including demosaicing processing on the pixel data stored in the storage unit, record the video data in a recording mode in which both of the video data and the pixel data stored in the storage are used as a recording data, and control the imaging sensor to perform imaging with a second exposure value that is different from a first exposure value corresponding to the BT. 709.

Another embodiment according to the technology of the present disclosure relates to a video recording device comprising the video control device described above, and a recording unit that records the recording data output from the development processing unit.

Still another embodiment according to the technology of the present disclosure relates to a video control method of a video control device including a storage unit that temporarily stores pixel data output from an imaging unit, the method comprising outputting video data obtained by performing development processing including demosaicing processing on the pixel data stored in the storage unit for generating the video data, and recording output the video data in a recording mode in which both of the video data and the pixel data stored in the storage are used as the recording data, and controlling the imaging sensor to perform imaging with a second exposure value that is different from a first exposure value corresponding to the BT. 709.

Still another embodiment according to the technology of the present disclosure relates to a video recording method comprising recording the recording data in the video control method described above.

Still another embodiment according to the technology of the present disclosure relates to a non-transitory computer readable recording medium storing a video control program of a video control device including a storage unit that temporarily stores pixel data output from an imaging unit, the program causing a processor of the video control device to execute a process comprising outputting video data obtained by performing development processing including demosaicing processing on the pixel data stored in the storage unit, and switching between a first recording mode in which only the video data out of the video data and the pixel data stored in the storage is used as recording data and a second recording mode in which both of the video data and the pixel data stored in the storage are used as the recording data, and controlling the imaging sensor to perform imaging with a second exposure value that is different from a first exposure values corresponding to the BT. 709.

According to one embodiment according to the technology of the present disclosure, it is possible to provide the video control device, the video recording device, the video control method, the video recording method, and the non-transitory computer readable recording medium storing the video control program capable of performing the imaging with an appropriate exposure value depending on whether or not the pixel data before the demosaicing processing is recorded.

DESCRIPTION OF THE PREFERRED EMBODIMENTS

In the following, embodiments of the present invention will be described with reference to the drawings.

First Embodiment

Imaging Apparatus 100 According to First Embodiment

Figure 1:
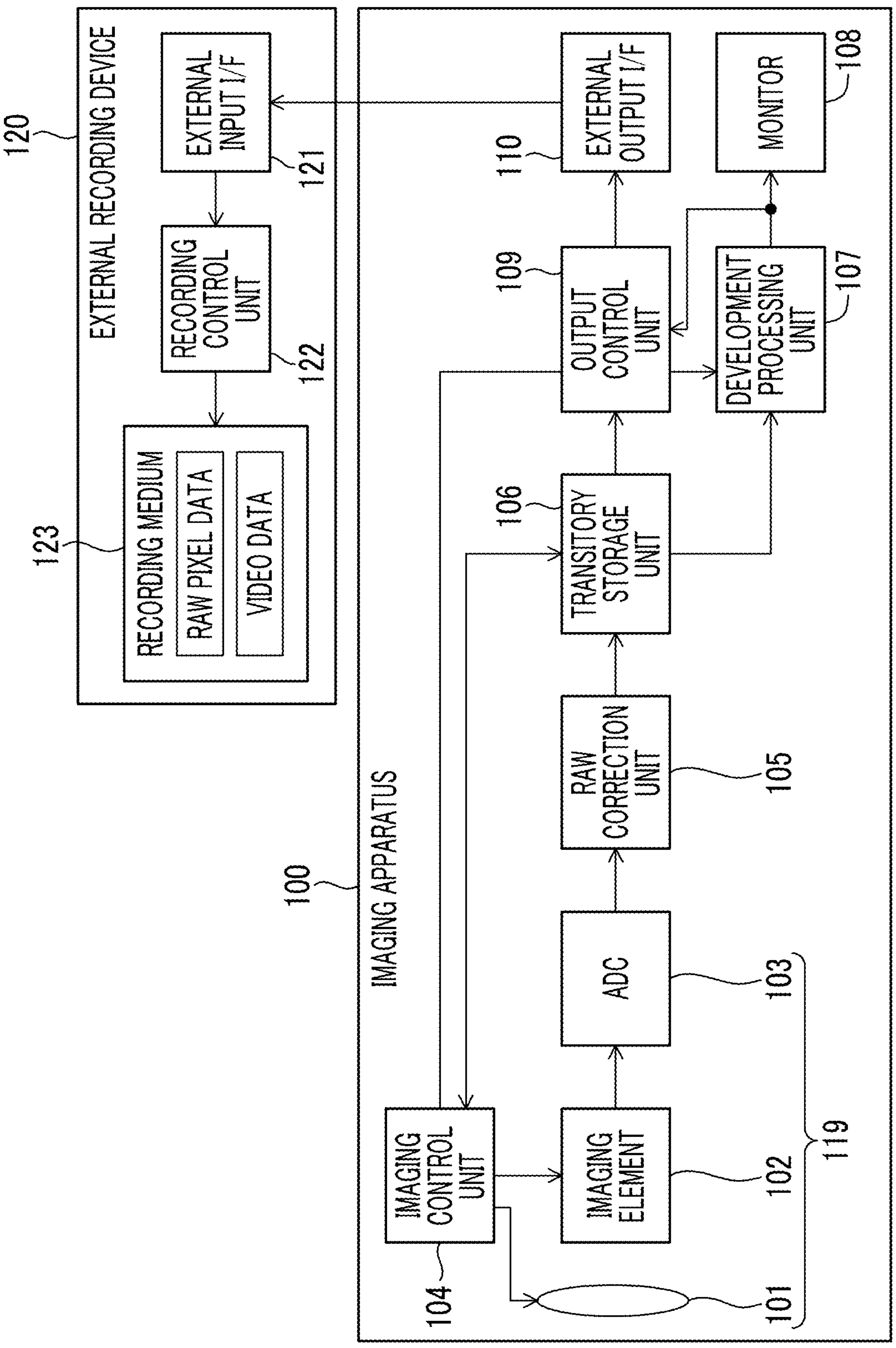
FIG. 1 is a diagram showing an example of an imaging apparatus 100 according to a first embodiment.

FIG. 1 is a diagram showing an example of an imaging apparatus 100 according to the first embodiment. The imaging apparatus 100 is a video control device that can generate a video by performing continuous imaging. It should be noted that the imaging apparatus 100 may have a function of generating a still image in addition to a function of generating the video.

An external recording device 120 is provided outside the imaging apparatus 100 and records RAW pixel data and video data output from the imaging apparatus 100, which will be described below. A data output terminal of the imaging apparatus 100 is connected to an input terminal of the external recording device 120 via a communication interface, such as a high-definition multimedia interface (HDMI). It should be noted that the HDMI is a registered trademark. The data output from the imaging apparatus 100 is not limited to the HDMI, and may be output by using wireless communication (for example, ultra wide band (UWB) or wireless high-definition multimedia interface-serial digital interface (HDMI-SDI)).

The imaging apparatus 100 comprises an imaging unit 119, an imaging control unit 104, a RAW correction unit 105, a transitory storage unit 106, a development processing unit 107, a monitor 108, an output control unit 109, and an external output I/F 110.

The imaging unit 119 generates image data of the video as a plurality of RAW pixel data that are continuous in a temporal order by performing the continuous imaging. Specifically, the imaging unit 119 includes an imaging lens system 101, an imaging element 102, and an analog/digital converter (ADC) 103. The ADC 103 may be incorporated in the imaging element 102.

The imaging lens system 101 includes a lens for transmitting light from a subject and forming an image on the imaging element 102. In addition, the imaging lens system 101 may also include a stop, a neutral density (ND) filter, a focus lens, a zoom lens, a shift lens, and the like. These movable units of the imaging lens system 101 are controlled by an imaging control unit 104.

The imaging element 102 converts an optical image by the imaging lens system 101 into an analog image signal, and outputs the converted analog image signal to the ADC 103. The imaging element 102 is configured by an imaging element, such as a complementary metal-oxide-semiconductor (CMOS) type image sensor or a charge-coupled device (CCD) type image sensor.

In addition, the imaging element 102 also comprises an electronic shutter that is a shutter for adjusting an exposure time. The imaging by the imaging element 102 is controlled by the imaging control unit 104. For example, during the video imaging, the imaging element 102 performs imaging continuously in a temporal order under the control of the imaging control unit 104 and sequentially outputs the obtained analog image signals to the ADC 103.

The ADC 103 converts the analog image signal from the imaging element 102 into digital RAW pixel data, and outputs the converted RAW pixel data to the RAW correction unit 105. The RAW pixel data continuously output from the ADC 103 is pixel data before demosaicing processing.

The imaging control unit 104 controls the imaging by the imaging unit 119 by controlling the imaging lens system 101 and the imaging element 102. For example, the imaging control unit 104 controls focus, exposure, or the like of imaging by the imaging unit 119 in response to an instruction from a user. In addition, the imaging control unit 104 may automatically control the exposure and the like of the imaging by the imaging unit 119 based on a demosaicing image obtained by the development processing unit 107, which will be described below.

In addition, the imaging control unit 104 also generates metadata indicating a condition for the imaging by the imaging lens system 101 and the imaging element 102 and outputs the generated metadata to the transitory storage unit 106. The transitory storage unit 106 is basically composed of a memory (of any type). The metadata is used in a case in which development processing of generating the demosaicing image based on the RAW pixel data is performed. Examples of the metadata include a black offset level, a coefficient for converting a RAW value into a color system, a white balance parameter, a lens correction parameter, a color conversion parameter, a gamma correction parameter, a noise correction parameter, a time code, imaging date and time, and a product name.

The RAW correction unit 105 corrects the RAW pixel data output from the ADC 103. The correction performed by the RAW correction unit 105 is correction performed on the RAW pixel data before the demosaicing processing, and examples thereof include pixel value correction, defective pixel correction, and shading correction in accordance with a characteristic of the imaging element 102 and the like. The RAW correction unit 105 outputs the corrected RAW pixel data to transitory storage unit 106.

The transitory storage unit 106 transitorily stores the RAW pixel data output from the RAW correction unit 105 and the metadata output from the imaging control unit 104. For example, the transitory storage unit 106 is realized by a memory, such as a random access memory (RAM). In addition, the transitory storage unit 106 may be realized by a plurality of memories. For example, the transitory storage unit 106 may be realized by a memory that stores the RAW pixel data and a memory that stores the metadata.

The development processing unit 107 based on the RAW pixel data and the metadata stored by the transitory storage unit 106 generates a demosaicing video by performing the development processing including the demosaicing processing, and outputs the generated demosaicing video to the monitor 108. In the RAW pixel data that has been subjected to the defective pixel correction, the shading correction, or the like, each pixel only has any one of an R color, a G color, or a B color. Therefore, the other two colors are complemented from surrounding pixels such that each pixel has data of three colors. For example, in a case in which the pixel has only the R color, G and B data are not present, so that G color data for that pixel is obtained by performing complement from data of surrounding G pixels or prediction from surrounding G pixels. As a result, each of all pixels has three colors of R, G, and B. This is called the demosaicing processing.

In addition, the development processing unit 107 generates the video data by performing various types of the image processing on the image data generated by the demosaicing processing, and outputs the generated video data to the monitor 108. Examples of the image processing performed after the development processing unit 107 performs the demosaicing processing include processing of gain correction, gamma correction, peripheral light amount falloff correction, color correction, contour enhancement, noise reducing, debayer processing, and compression.

As an example, the development processing unit 107 performs various types of the image processing on the image data to generate the video data corresponding to BT. 709. The BT. 709 is a video standard adopted by a general television or monitor. In this case, the development processing unit 107 performs the gamma correction based on a gamma characteristic corresponding to the BT. 709 as one of the image processing.

The monitor 108 displays the video based on the video data output from the development processing unit 107 to the user. As a result, the user can confirm the video being captured as a live image during the imaging of the video.

The output control unit 109 controls the output of the video data after the demosaicing processing corrected by the development processing unit 107 and the RAW pixel data before the demosaicing processing stored in the transitory storage unit 106. In addition, the output control unit 109 constitutes a mode switch control unit according to one embodiment according to the technology of the present disclosure, which switches between a first recording mode and a second recording mode.

The first recording mode is a mode in which only the video data out of the video data and the RAW pixel data is used as the recording data (recording target data). The second recording mode is a mode in which the video data and the RAW pixel data are used as the recording data. The recording data is the recording target data on a recording medium 123, which will be described below. For example, the output control unit 109 may switch between the first recording mode and the second recording mode based on the instruction from the user, or may automatically switch based on various data, such as a free capacity of the recording medium 123, which will be described below.

In the first recording mode, the output control unit 109 outputs the video data after the demosaicing processing corrected by the development processing unit 107 from the external output I/F 110 to the external recording device 120. In addition, in the first recording mode, the output control unit 109 does not output the RAW pixel data stored in the transitory storage unit 106 to the external recording device 120.

In the second recording mode, the output control unit 109 outputs the video data after the demosaicing processing corrected by the development processing unit 107 and the RAW pixel data before the demosaicing processing stored in the transitory storage unit 106 from the external output I/F 110 to the external recording device 120. In addition, the output control unit 109 adds the metadata stored in the transitory storage unit 106 to the RAW pixel data in a case in which the RAW pixel data is output from the external output I/F 110.

In addition, the output control unit 109 controls the imaging unit 119 to perform the imaging with different exposure values between the first recording mode and the second recording mode. Specifically, the output control unit 109 controls the imaging unit 119 via the imaging control unit 104 such that the exposure value of the imaging in the second recording mode is lower than the exposure value of the imaging in the first recording mode. The control of the exposure value can be performed by adjusting at least any of an F number (F-number), an exposure time (shutter speed), or international organization for standardization (ISO) sensitivity.

As an example, the output control unit 109 controls the imaging unit 119 to perform the imaging with a first exposure value in the first recording mode. The first exposure value is, for example, the exposure value at which the video data having appropriate brightness is obtained in a case in which the video data of the BT. 709 is generated.

In addition, in the second recording mode, the output control unit 109 controls the imaging unit 119 to perform the imaging with a second exposure value that is lower (darker) than the first exposure value. The second exposure value is, for example, the exposure value that is lower than the first exposure value by an increase in the brightness due to the gain correction, which will be described below, performed in the second recording mode.

In addition, the output control unit 109 controls the development processing performed by the development processing unit 107 to be different between the first recording mode and the second recording mode. For example, the output control unit 109 controls the image processing related to the brightness performed by the development processing unit 107 to be different between the first recording mode and the second recording mode.

The image processing related to the brightness performed by the development processing unit 107 is, for example, the gamma correction, the gain correction, and look-up table (LUT) processing, or a combination of a plurality of these pieces of processing. The LUT processing is processing of converting RGB three primary colors as input values into a predetermined output value for each input value. For example, there are a LUT that inputs and outputs brightness Y, and a three-dimensional (3D) LUT that inputs and outputs the RGB. In addition, the image processing related to the brightness may be processing performed before the demosaicing processing in development processing performed by the development processing unit 107, or may be processing performed after the demosaicing processing.

The output control unit 109 controls an increase amount of the brightness of the video data due to the image processing related to the brightness, which is performed by the development processing unit 107 in the second recording mode, to be larger than an increase amount of brightness of the video data due to the image processing related to the brightness, which is performed by the development processing unit 107 in the first recording mode.

A large increase amount of the brightness means, for example, a large increase amount of the output values for all the input values. It should be noted that a large increase amount of the brightness may mean, for example, a large average increase amount of the output value with respect to the input value, or may mean that the output values are small with respect to some input values.

For example, in both the first recording mode and the second recording mode, the output control unit 109 causes the development processing unit 107 to execute the same gamma correction using the gamma characteristic corresponding to the BT. 709. In addition, the output control unit 109 causes the development processing unit 107 to further execute the gain correction for increasing the brightness in the second recording mode, and causes the development processing unit 107 not to execute this gain correction in the first recording mode. As a result, the increase amount of the brightness of the video data is larger in the second recording mode than in the first recording mode due to the gain correction.

For example, this gain correction is the gain correction in which the video data of the BT. 709 having appropriate brightness is obtained based on the RAW pixel data obtained by the imaging with the second exposure value that is lower than the first exposure value in the second recording mode.

The external output I/F 110 is a communication interface for communicating with the external recording device 120. As an example, the external output I/F 110 performs communication by the HDMI. The external output I/F 110 outputs the RAW pixel data and the video data to the external recording device 120 under the control of the output control unit 109.

It should be noted that the imaging apparatus 100 may comprise an internal memory that stores the video data obtained by the development processing unit 107. In addition, the imaging apparatus 100 may also comprise a user interface that receives various instructions from the user and outputs various data to the user.

In addition, the imaging apparatus 100 may also comprise a microphone that converts peripheral sound into an electrical signal. In this case, the electrical signal obtained by the microphone may be converted into digital sound data, output together with the RAW pixel data and the video data from the external output I/F 110 to the external recording device 120, and recorded by the external recording device 120.

The external recording device 120 comprises an external input I/F 121, a recording control unit 122, and a recording medium 123. The external input I/F 121 takes in the RAW pixel data and the video data output from the external output I/F 110 of the imaging apparatus 100 and outputs the taken-in RAW pixel data and video data to the recording control unit 122.

The recording control unit 122 performs control of recording the RAW pixel data and the video data output from the external input I/F 121 in the recording medium 123. The recording medium 123 is a large-capacity recording medium capable of high-speed writing such that large-capacity RAW pixel data and the video data continuously output from the imaging apparatus 100 can be recorded in real time. For example, the recording medium 123 can be realized by a memory card or a solid state drive (SSD).

In the first recording mode, the video data is sequentially recorded in the recording medium 123, and the RAW pixel data is not recorded. In the second recording mode, the video data and the RAW pixel data are recorded in parallel in the recording medium 123. For example, in the second recording mode, the video data and the RAW pixel data may be simultaneously recorded in the recording medium 123, the video data and the RAW pixel data may be recorded with a time difference, or the video data and the RAW pixel data may be alternately recorded.

In addition, although not shown, the external recording device 120 includes an external output I/F that outputs the RAW pixel data and the video data stored in the recording medium 123 to an external data processing device (for example, a personal computer) different from the imaging apparatus 100 and the external recording device 120. As a result, the data processing device can perform the management of the RAW pixel data and the video data stored in the recording medium 123 or the development processing based on the RAW pixel data.

Alternatively, the external recording device 120 may be a data processing device (for example, a personal computer) including a processor and a memory for performing the development processing. In this case, the external recording device 120 can perform the management of the RAW pixel data and the video data stored in the recording medium 123 and the development processing based on the RAW pixel data.

<Hardware Configuration of Imaging Apparatus 100>

The imaging control unit 104, the RAW correction unit 105, the development processing unit 107, and the output control unit 109 in the imaging apparatus 100 are realized by the processor that is operated in cooperation with the memory of the imaging apparatus 100.

This processor is, for example, a processor, such as a central processing unit (CPU), a micro processing unit (MPU), a field programmable gate array (FPGA), a programmable logic device (PLD), or an application specific integrated circuit (ASIC). This processor functions as a processing unit in the imaging apparatus 100 by reading out and executing a program stored in the memory. More specifically, a structure of these various processors is an electric circuit in which circuit elements, such as semiconductor elements, are combined. It should be noted that this processor may be a combination of a plurality of processors of the same type or different types.

The memory is realized by a RAM, a read only memory (ROM), a flash memory, or the like. The memory stores the program executed by the processor, the data used by the processor, or the like. It should be noted that this memory may be a combination of a plurality of memories of the same type or different types.

Processing by Imaging Apparatus 100 According to First Embodiment

Figure 2:
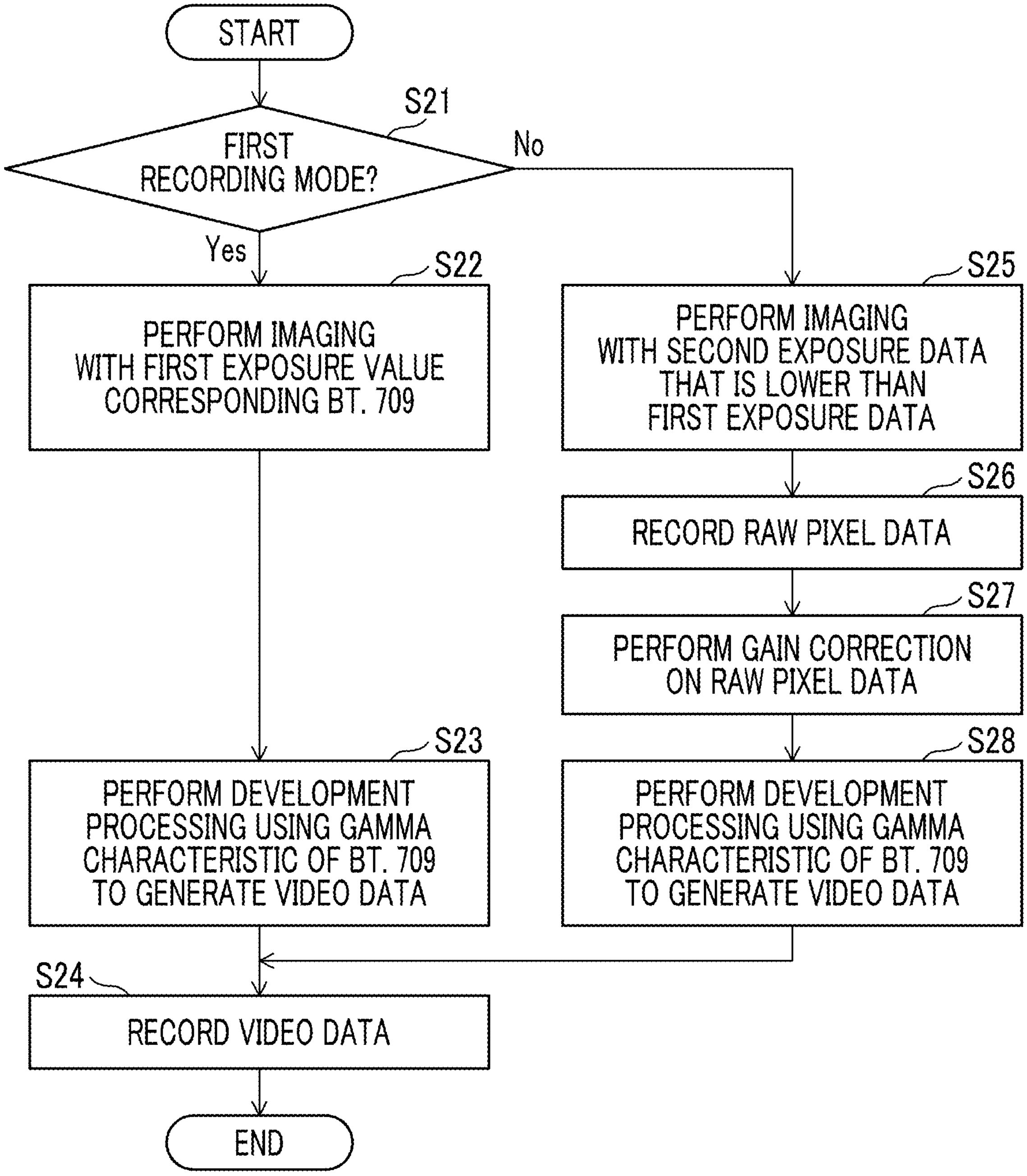
FIG. 2 is a flowchart showing an example of processing by the imaging apparatus 100 according to the first embodiment.

FIG. 2 is a flowchart showing an example of processing by the imaging apparatus 100 according to the first embodiment. For example, the imaging apparatus 100 executes the processing shown in FIG. 2 for each frame of the imaging during the imaging of the video. The processing shown in FIG. 2 is executed by the output control unit 109, for example.

First, the output control unit 109 determines whether or not the current mode is the first recording mode (step S21). In a case in which the current mode is the first recording mode (step S21: Yes), the output control unit 109 controls the imaging unit 119 via the imaging control unit 104 to perform the imaging for one frame with the first exposure value described above corresponding to the BT. 709 (step S22).

Next, the output control unit 109 controls the development processing unit 107 to perform the development processing including the gamma correction using the gamma characteristic of the BT. 709 based on the RAW pixel data obtained in step S22, and generates the video data of the BT. 709 (step S23).

Next, the output control unit 109 records the video data generated in step S23 (step S24), and terminates the series of processing for that frame. In step S24, the output control unit 109 records the video data in the recording medium 123 of the external recording device 120 by outputting the video data from the external output I/F 110 to the external recording device 120.

In step S21, in a case in which the current mode is not the first recording mode (step S21: No), that is, in a case in which the current mode is the second recording mode, the output control unit 109 controls the imaging unit 119 via the imaging control unit 104 to perform the imaging for one frame with the second exposure value that is lower than the first exposure value (step S25).

Next, the output control unit 109 records the RAW pixel data obtained in step S25 (step S26). In step S26, the output control unit 109 records the RAW pixel data in the recording medium 123 of the external recording device 120 by outputting the RAW pixel data from the external output I/F 110 to the external recording device 120.

In addition, the output control unit 109 performs the gain correction for increasing the brightness of the RAW pixel data obtained in step S25 (step S27). Next, the output control unit 109 controls the development processing unit 107 to perform the development processing including the gamma correction using the gamma characteristic of the BT. 709 based on the RAW pixel data that has been subjected to the gain correction in step S27, and generates the video data of the BT. 709 (step S28). Next, the output control unit 109 proceeds with step S24, records the video data generated in step S28, and terminates the series of processing for that frame.

<Gamma Characteristic of BT. 709>

Figure 3:
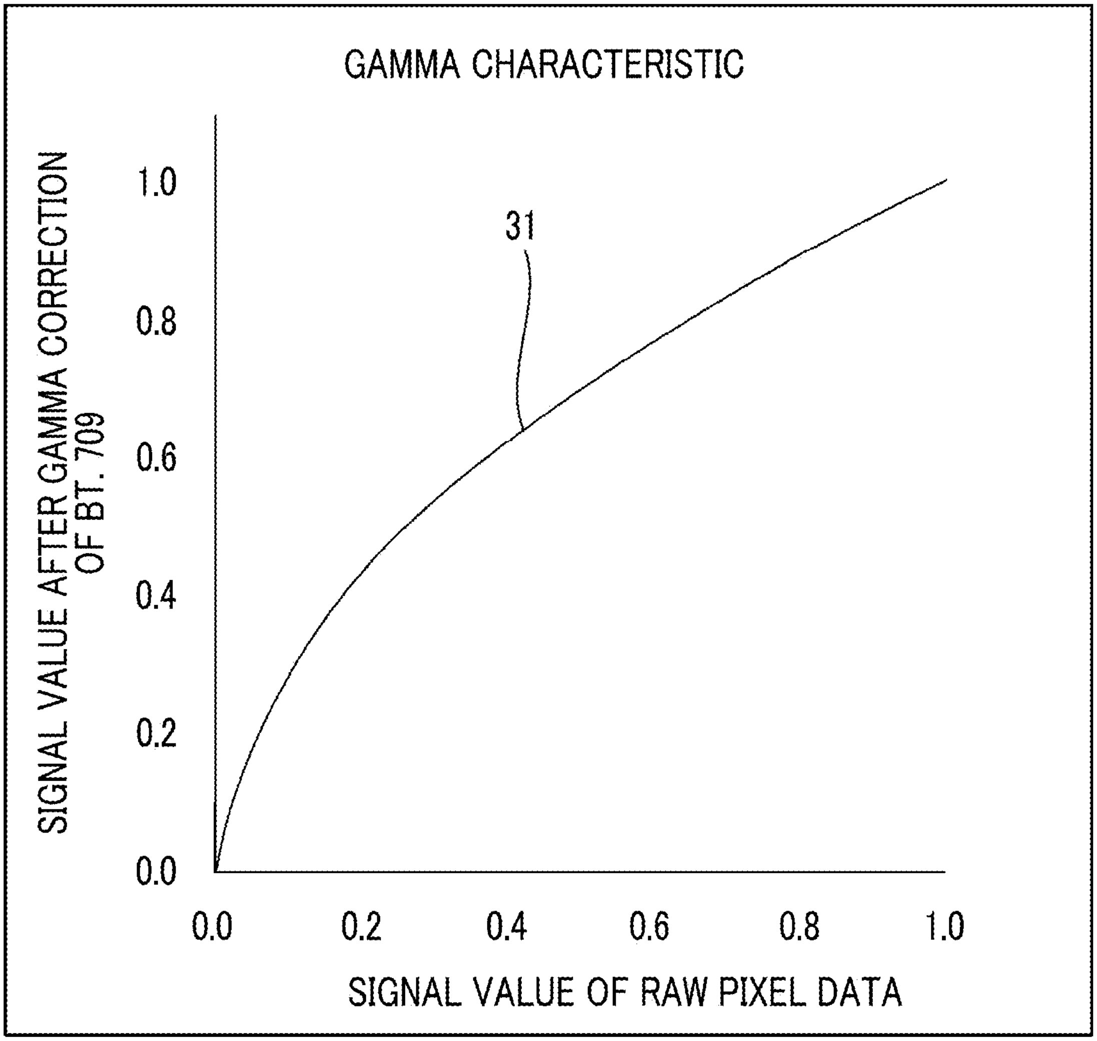
FIG. 3 is a diagram showing an example of a gamma characteristic of BT. 709.

FIG. 3 is a diagram showing an example of the gamma characteristic of the BT. 709. In FIG. 3, a horizontal axis indicates a signal value of the RAW pixel data, and a vertical axis indicates a signal value of the video data after the gamma correction of the BT. 709. A gamma characteristic 31 is the gamma characteristic in the gamma correction of the BT. 709. In the development processing of steps S23 and S28 shown in FIG. 2, the imaging apparatus 100 performs the gamma correction using the gamma characteristic 31, for example.

Figure 4:
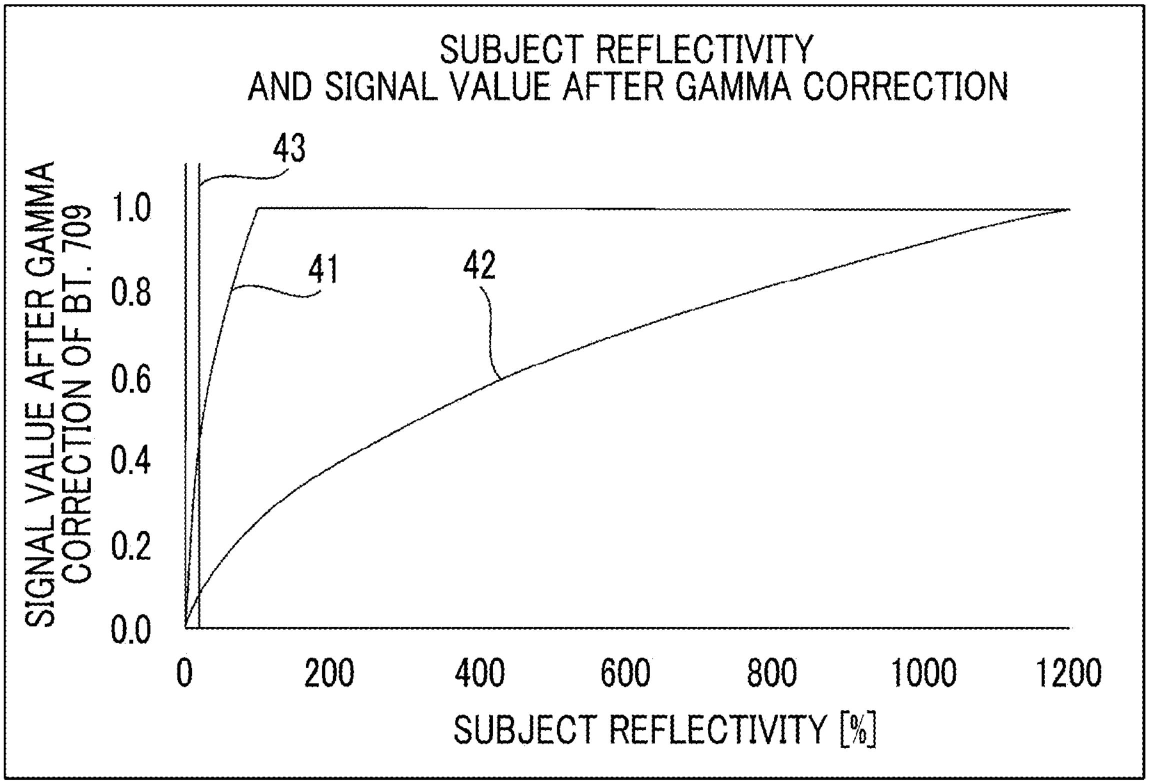
FIG. 4 is a diagram showing a relationship between a subject reflectivity and a signal value after gamma correction in a gamma characteristic 31 shown in FIG. 3.

FIG. 4 is a diagram showing a relationship between a subject reflectivity and the signal value after the gamma correction in the gamma characteristic 31 shown in FIG. 3. In FIG. 4, a horizontal axis indicates the subject reflectivity [%] (that is, the brightness of the subject of the imaging), and a vertical axis indicates the signal value of the video data after the gamma correction of the BT. 709.

A signal value characteristic 41 is a characteristic of the signal value of the video data after the gamma correction of the BT. 709 in a case in which the imaging is performed with the first exposure value described above corresponding to the BT. 709. The signal value characteristic 41 has, for example, a signal value near 0.5 at the subject reflectivity 43 of 18% gray, which is an appropriate brightness characteristic.

A signal value characteristic 42 is shown with reference to the characteristic of the signal value of the video data after the gamma correction of the BT. 709 in a case in which the imaging is performed with the second exposure value that is lower than the first exposure value described above. The signal value characteristic 42 is a characteristic that is darker than the signal value characteristic 41 because the exposure value of the imaging is low.

In the first recording mode, since the imaging is performed with the first exposure value, the video data having appropriate brightness, such as the signal value characteristic 41, is obtained.

In the second recording mode, the imaging is performed with the second exposure value that is lower than the first exposure value, but the gain correction for increasing the brightness is performed separately from the gamma correction based on the gamma characteristic 31, and thus the video data having appropriate brightness is recorded similarly to the first recording mode. In addition, for the RAW pixel data, the RAW pixel data with a wide dynamic range, such as the signal value characteristic 42, is recorded. As a result, a degree of freedom in processing in the development processing after storage by the recording medium 123.

As described above, with the imaging apparatus 100 according to the first embodiment, the imaging unit 119 performs the imaging with different exposure values between the first recording mode in which only the video data out of the video data and the RAW pixel data is used as the recording data, and the second recording mode in which the video data and the RAW pixel data are used as the recording data.

As a result, the imaging can be performed with the appropriate first exposure value in the first recording mode in which the RAW pixel data is not stored, the imaging can be performed with the low second exposure value at which the RAW pixel data having the degree of freedom in processing in the development processing is obtained in the second recording mode in which the RAW pixel data is stored. Therefore, it is possible to perform the imaging with the appropriate exposure value depending on whether or the RAW pixel data is recorded.

By obtaining the RAW pixel data with a wide dynamic range and a high degree of freedom in processing, it is possible to generate the video data capable of expressing a wide brightness range, such as hybrid log gamma (HLG), by subsequent development processing.

In addition, the imaging apparatus 100 may perform different development processing of generating the video data after the demosaicing between the first recording mode and the second recording mode. For example, the imaging apparatus 100 performs different image processing related to the brightness included in the development processing between the first recording mode and the second recording mode.

As a result, the increase amount of the brightness of the video data due to the image processing related to the brightness in the second recording mode can be made larger than the increase amount of the brightness of the video data due to the image processing related to the brightness in the first recording mode, so that it is possible to suppress the decrease in the brightness of the video data obtained in the second recording mode. That is, in the second recording mode, it is possible to suppress the decrease in the brightness of the video data while obtaining the RAW pixel data with a high degree of freedom in processing in the development processing.

It should be noted that the configuration has been described in which the gain correction (for example, step S27 of FIG. 2) in the second recording mode is performed on the RAW pixel data before the demosaicing processing, but the imaging apparatus 100 may perform the gain correction in the second recording mode on the image data after the demosaicing processing.

Second Embodiment

A different part of the second embodiment from the first embodiment will be described.

Processing by Imaging Apparatus 100 According to Second Embodiment

Figure 5:
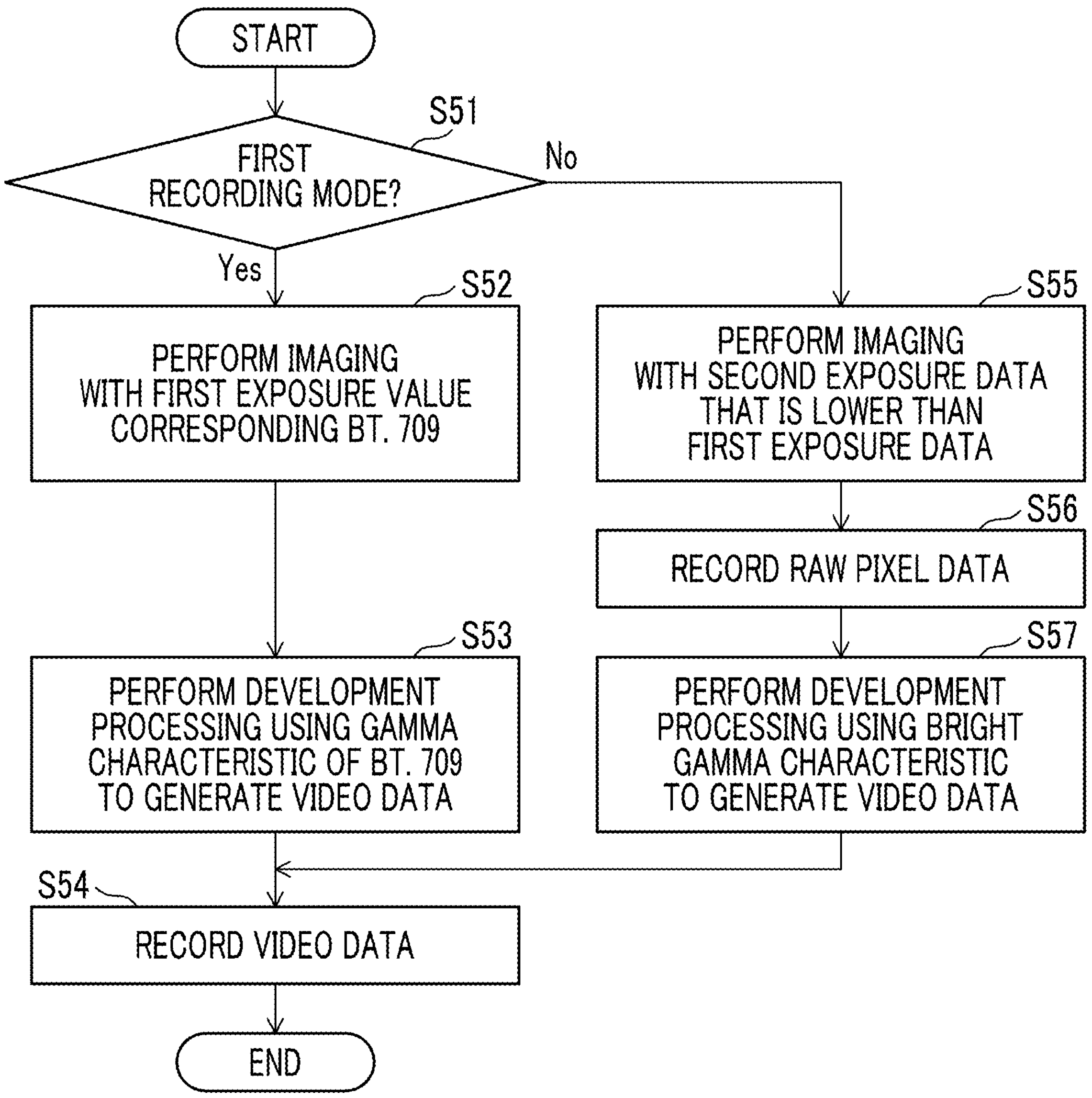
FIG. 5 is a flowchart showing an example of processing by the imaging apparatus 100 according to a second embodiment.

FIG. 5 is a flowchart showing an example of processing by the imaging apparatus 100 according to the second embodiment. For example, the imaging apparatus 100 according to the second embodiment executes the processing shown in FIG. 5 for each frame of the imaging during the imaging of the video. The processing shown in FIG. 5 is executed by the output control unit 109, for example.

Steps S51 to S57 shown in FIG. 5 are the same as steps S21 to S26, and S28 shown in FIG. 2. It should be noted that, in the development processing in step S57, the output control unit 109 performs the gamma correction using the gamma characteristic that is brighter than the gamma characteristic of the BT. 709 based on the RAW pixel data obtained in step S55 to generate the video data of the BT. 709 (step S57). The gamma characteristic that is brighter than the gamma characteristic of the BT. 709 refers to the gamma characteristic (for example, see FIG. 6) that has a higher average ratio of the output value to the input value than the gamma characteristic of the BT. 709.

That is, in the processing shown in FIG. 5, instead of performing the processing of the gain correction on the RAW pixel data (for example, step S27 of FIG. 2), the gamma characteristic used for the development processing in the second recording mode is made brighter than the gamma characteristic used for the development processing in the first recording mode.

<Gamma Characteristic Brighter than Gamma Characteristic of BT. 709>

Figure 6:
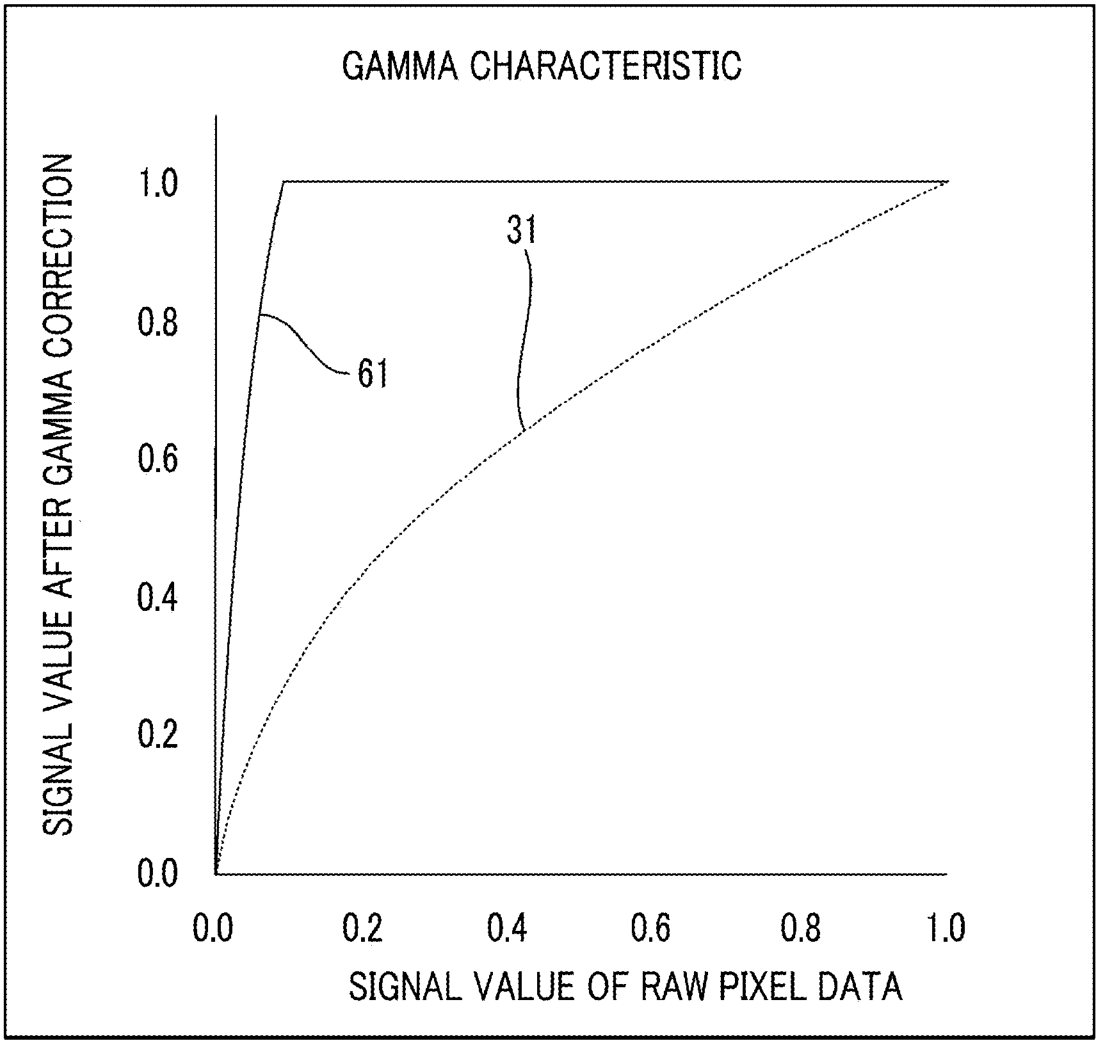
FIG. 6 is a diagram showing an example of a gamma characteristic brighter than a gamma characteristic of the BT. 709.

FIG. 6 is a diagram showing an example of the gamma characteristic brighter than the gamma characteristic of the BT. 709. In FIG. 6, the same parts as those shown in FIG. 3 are designated by the same reference numerals, and the description thereof will be omitted. A gamma characteristic 61 is the gamma characteristic that is brighter than the gamma characteristic 31 of the BT. 709. Specifically, the gamma characteristic 61 is obtained by compressing the gamma characteristic 31 in a horizontal direction.

For example, the output control unit 109 uses the gamma characteristic 31 for the correction in the development processing in step S53 shown in FIG. 5 (that is, the development processing in the first recording mode), and uses the gamma characteristic 61 for the correction in the development processing in step S57 shown in FIG. 5 (that is, the development processing in the second recording mode).

Figure 7:
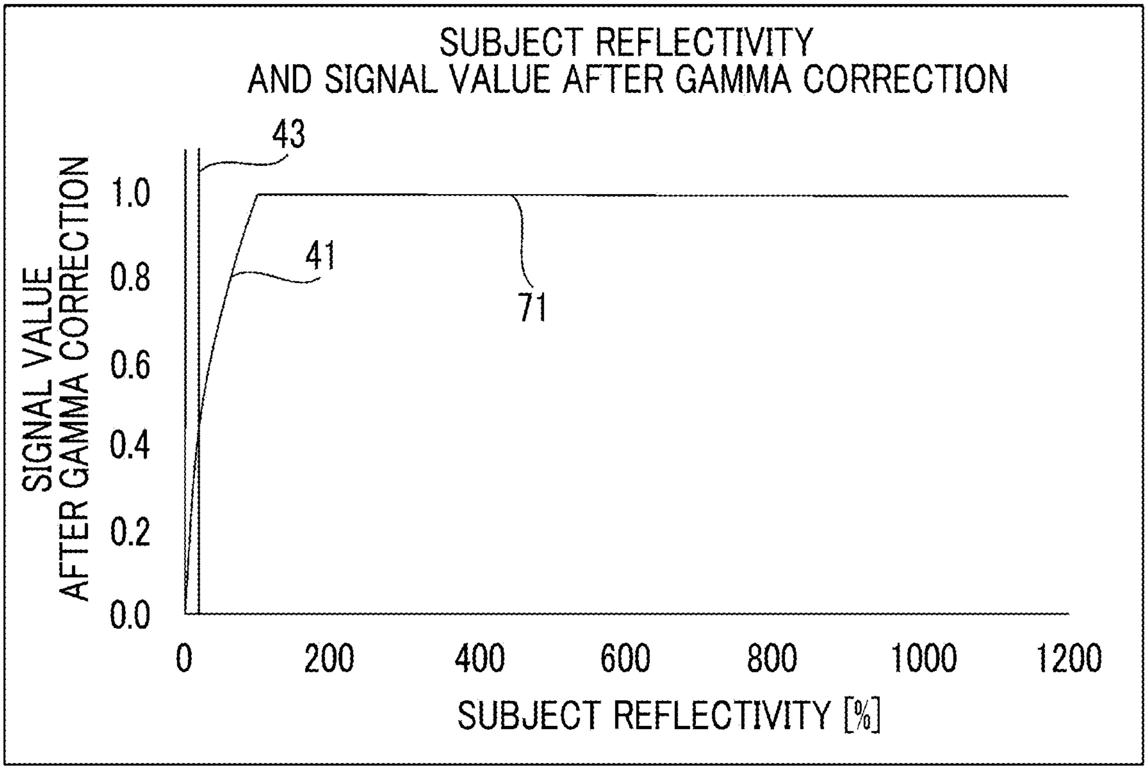
FIG. 7 is a diagram showing a relationship between a subject reflectivity and a signal value after gamma correction in a gamma characteristic 61 shown in FIG. 6.

FIG. 7 is a diagram showing a relationship between the subject reflectivity and the signal value after the gamma correction in the gamma characteristic 61 shown in FIG. 6. In FIG. 7, the same parts as those shown in FIG. 4 are designated by the same reference numerals, and the description thereof will be omitted.

A signal value characteristic 71 is the characteristic of the signal value of the video data after the imaging with the second exposure value that is lower than the first exposure value and the gamma correction using the gamma characteristic 61. The signal value characteristic 71 is the same characteristic as the signal value characteristic 41 in a case in which the imaging is performed with the first exposure value described above corresponding to the BT. 709. Therefore, similarly to the first embodiment, the video data having appropriate brightness is recorded even in the second recording mode.

Figure 8:
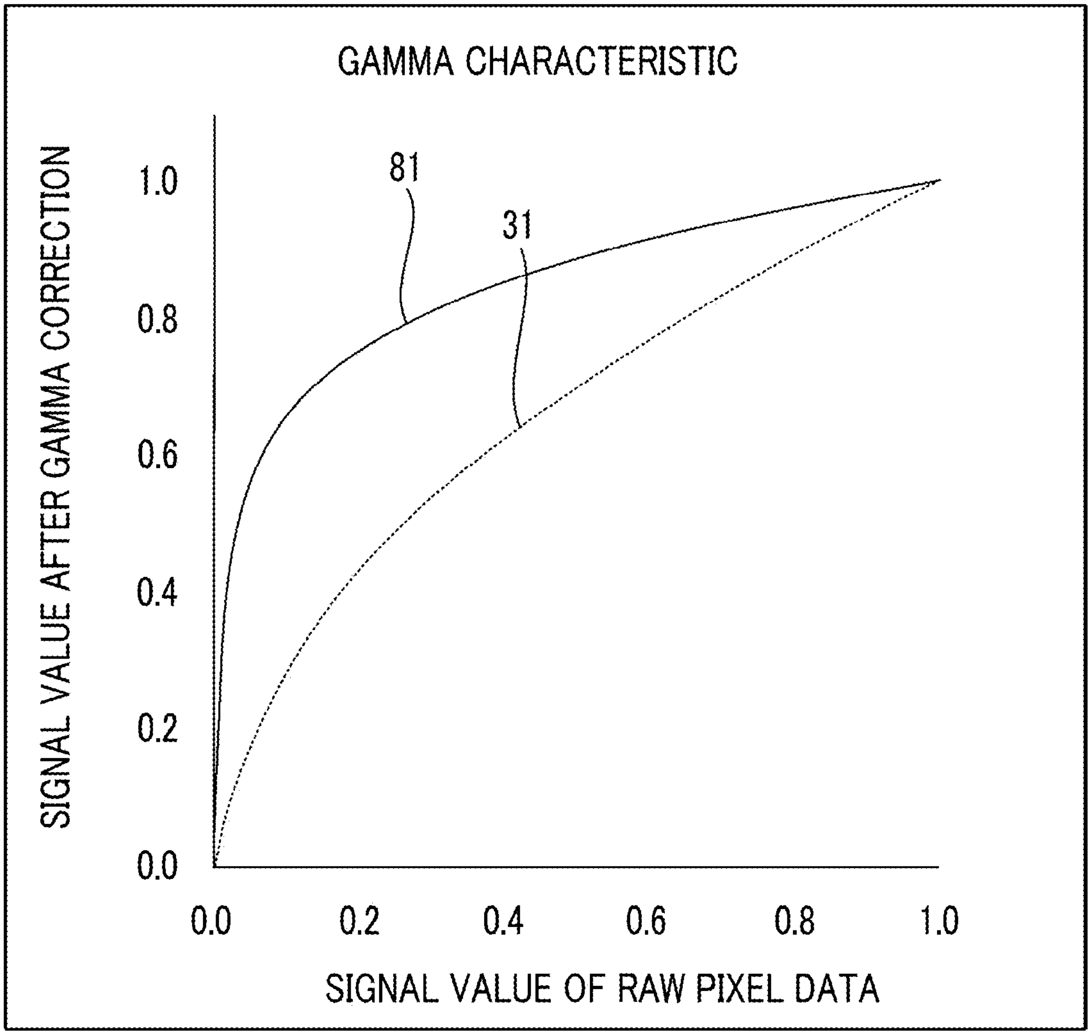
FIG. 8 is a diagram showing another example of the gamma characteristic brighter than the gamma characteristic of the BT. 709.

FIG. 8 is a diagram showing another example of the gamma characteristic brighter than the gamma characteristic of the BT. 709. In FIG. 8, the same parts as those shown in FIG. 3 are designated by the same reference numerals, and the description thereof will be omitted. A gamma characteristic 81 is the gamma characteristic that is brighter than the gamma characteristic 31 of the BT. 709. Specifically, the gamma characteristic 81 is a gamma characteristic in which a rise of a dark portion is sharper than that of the gamma characteristic 31.

For example, the output control unit 109 uses the gamma characteristic 31 for the correction in the development processing in step S53 shown in FIG. 5 (that is, the development processing in the first recording mode), and uses the gamma characteristic 81 for the correction in the development processing in step S57 shown in FIG. 5 (that is, the development processing in the second recording mode).

Figure 9:
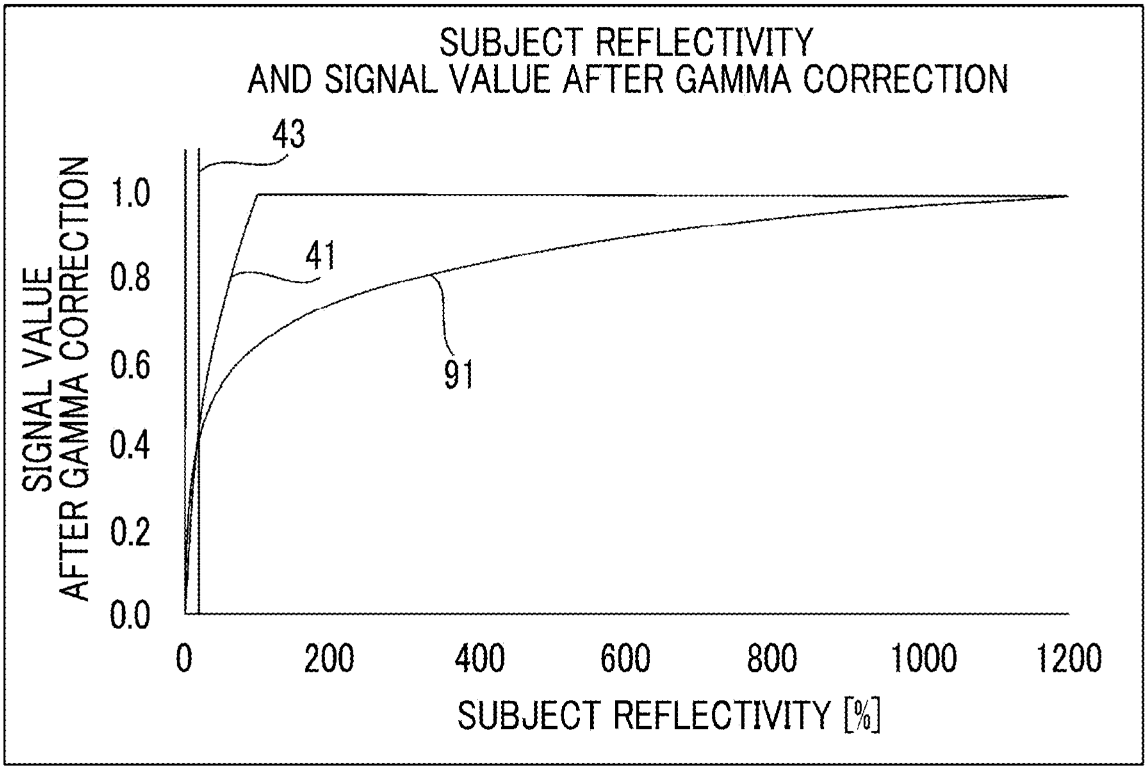
FIG. 9 is a diagram showing a relationship between a subject reflectivity and a signal value after gamma correction in a gamma characteristic 81 shown in FIG. 8.

FIG. 9 is a diagram showing a relationship between the subject reflectivity and the signal value after the gamma correction in the gamma characteristic 81 shown in FIG. 8. In FIG. 9, the same parts as those shown in FIG. 4 are designated by the same reference numerals, and the description thereof will be omitted.

A signal value characteristic 91 is the characteristic of the signal value of the video data after the imaging with the second exposure value that is lower than the first exposure value described above and the gamma correction using the gamma characteristic 81. The signal value characteristic 91 has the brightness suitable for the BT. 709 and has a wide dynamic range. Therefore, similarly to the first embodiment, the video data having appropriate brightness is recorded even in the second recording mode. Further, this video data has a wide dynamic range and a high degree of freedom in processing in the development processing.

As described above, with the imaging apparatus 100 according to the second embodiment, since the different gamma correction is performed between the first recording mode and the second recording mode, it is possible to suppress the decrease in the brightness of the video data while obtaining the RAW pixel data with a high degree of freedom in processing in the development processing in the second recording mode, similarly to the imaging apparatus 100 according to the first embodiment.

Third Embodiment

A different part of the third embodiment from the first and second embodiments will be described.

Processing by Imaging Apparatus 100 According to Third Embodiment

Figure 10:
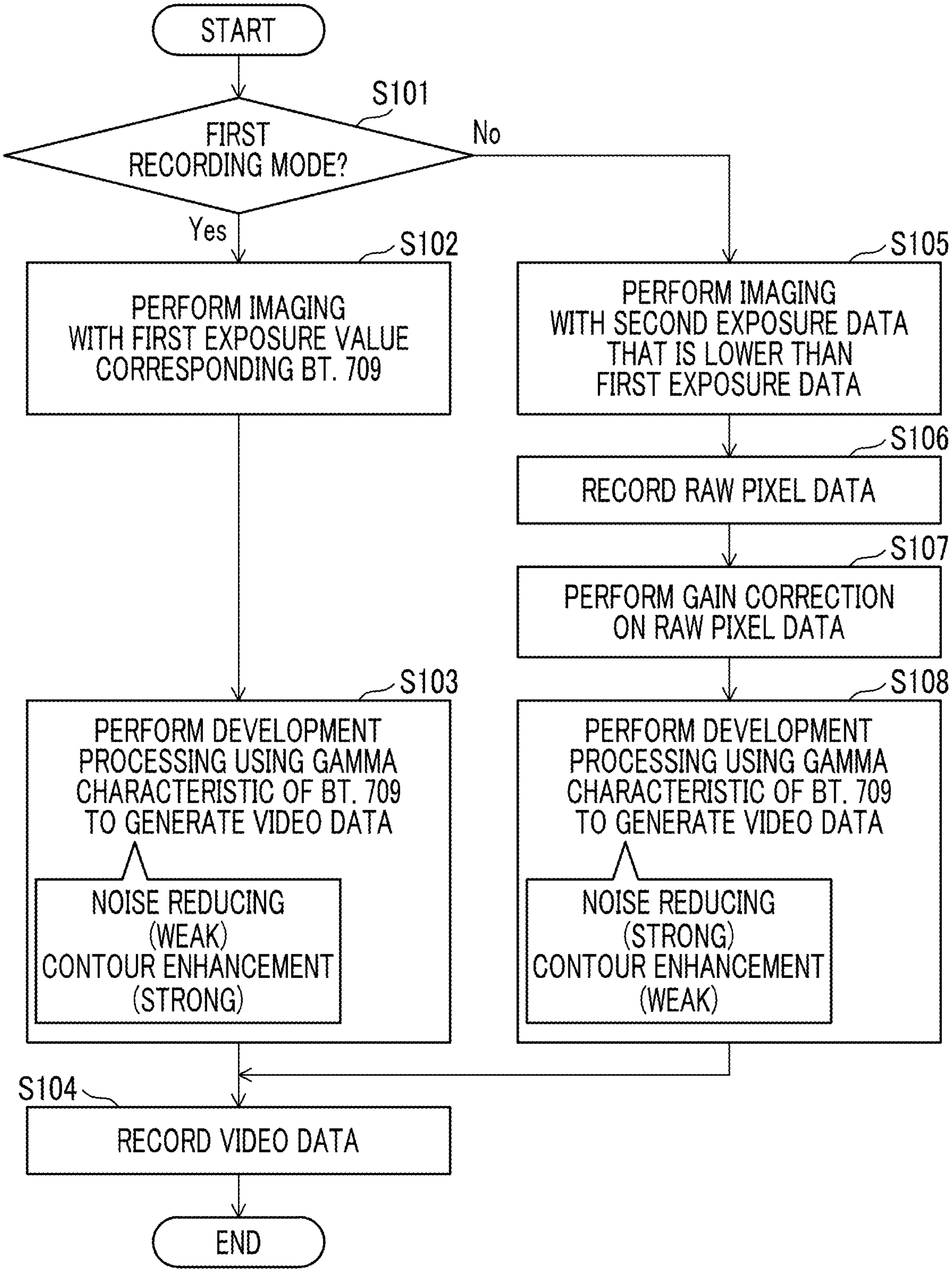
FIG. 10 is a flowchart showing an example of processing by the imaging apparatus 100 according to a third embodiment.

FIG. 10 is a flowchart showing an example of processing by the imaging apparatus 100 according to the third embodiment. For example, the imaging apparatus 100 according to the third embodiment executes the processing shown in FIG. 10 for each frame of the imaging during the imaging of the video. The processing shown in FIG. 10 is executed by the output control unit 109, for example.

Steps S101 to S108 shown in FIG. 10 are the same as steps S21 to S28 shown in FIG. 2. It should be noted that, in the development processing in steps S103 and S108, the output control unit 109 performs processing of each of noise reducing and contour enhancement.

In addition, in the development processing in step S108, the output control unit 109 performs the noise reducing having a stronger noise reducing effect than the noise reducing in the development processing in step S103. As a result, appropriate noise reducing can be performed on the noise amplified by the gain correction in step S107.

In addition, in the development processing in step S108, the output control unit 109 performs the contour enhancement with a weaker contour enhancement effect than in the development processing in step S103. As a result, it is possible to suppress a further deterioration of the image quality of the image in which the noise is amplified by the gain correction in step S107 due to the contour enhancement.

As described above, the imaging apparatus 100 according to the third embodiment performs different noise processing between the first recording mode and the second recording mode. As a result, appropriate noise reducing can be performed on the noise in the second recording mode, which is larger than in the first recording mode.

In addition, the imaging apparatus 100 according to the third embodiment performs different contour processing between the first recording mode and the second recording mode. As a result, it is possible to suppress a deterioration of the image quality of the video data due to the contour enhancement in the second recording mode in which the noise is larger than in the first recording mode.

Fourth Embodiment

A different part of the fourth embodiment from the first to third embodiments will be described.

Imaging Apparatus 100 According to Fourth Embodiment

Figure 11:
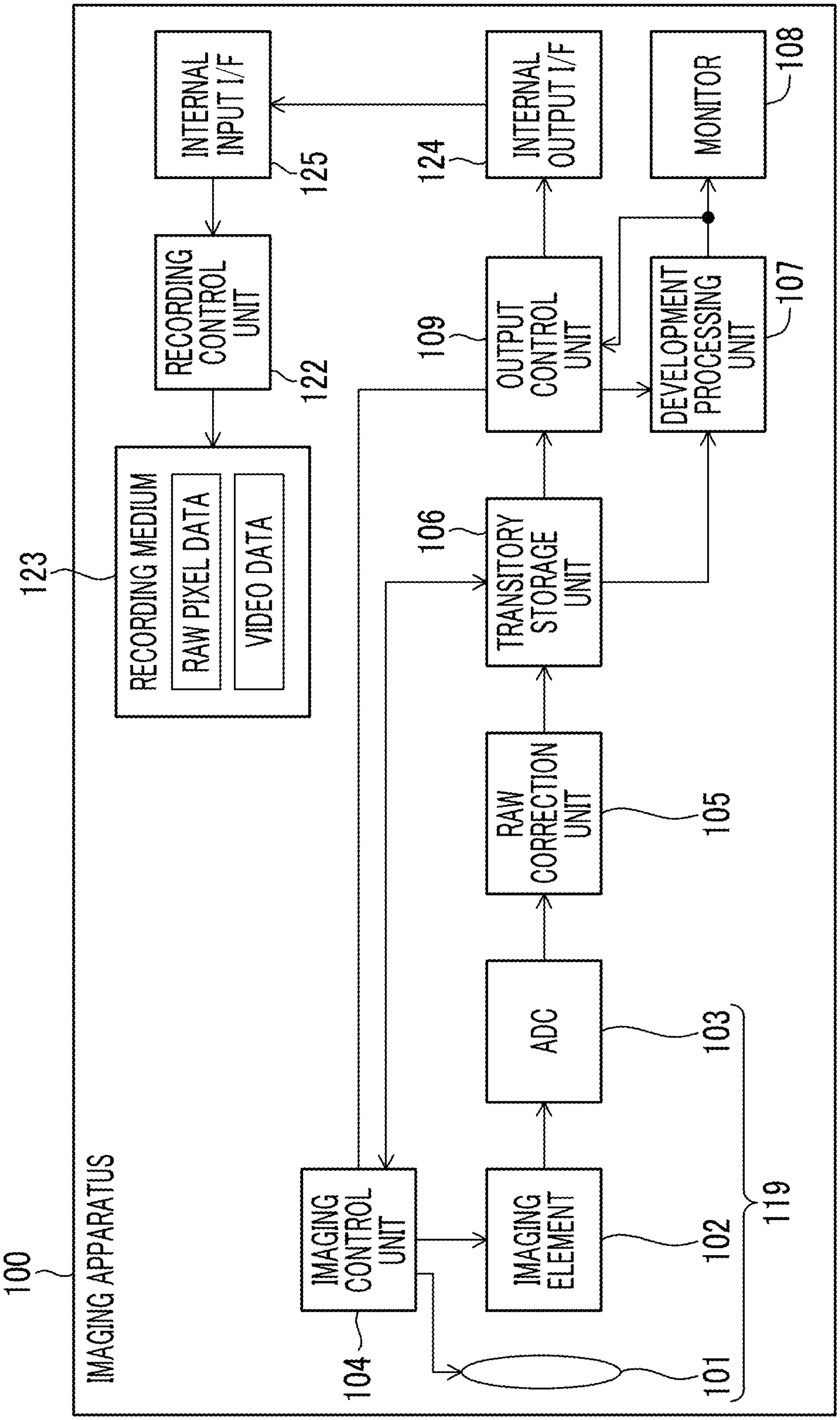
FIG. 11 is a diagram showing an example of the imaging apparatus 100 according to a fourth embodiment.

FIG. 11 is a diagram showing an example of the imaging apparatus 100 according to the fourth embodiment. In FIG. 11, the same parts as those shown in FIG. 1 are designated by the same reference numerals, and the description thereof will be omitted.

The imaging apparatus 100 according to the fourth embodiment is a video recording device comprising an internal output I/F 124, an internal input I/F 125, the recording control unit 122, and the recording medium 123, instead of the external output I/F 110 shown in FIG. 1.

The internal output I/F 124 is an interface, such as the HDMI similar to the external output I/F 110 shown in FIG. 1, but is different from the external output I/F 110 in that the communication with the internal input I/F 125 inside the imaging apparatus 100. The internal input I/F 125 is an interface, such as the HDMI similar to the external input I/F 121 of the external recording device 120 shown in FIG. 1, but is different from the external input I/F 121 in that the internal input I/F 125 is provided inside the imaging apparatus 100.

The recording control unit 122 and the recording medium 123 shown in FIG. 11 have the same configurations as the recording control unit 122 and the recording medium 123 shown in FIG. 1, but are provided inside the imaging apparatus 100. That is, the imaging apparatus 100 shown in FIG. 11 incorporates the high-speed and large-capacity recording medium 123, and the RAW pixel data and the video data are output to the recording medium 123 by using the interface inside the imaging apparatus 100.

In this case, for example, in step S24 shown in FIG. 2, the output control unit 109 outputs the video data from the internal output I/F 124 to the internal input I/F 125 to record the video data in the recording medium 123 of the imaging apparatus 100. In addition, in step S26 shown in FIG. 2, the output control unit 109 outputs the RAW pixel data from the internal output I/F 124 to the internal input I/F 125 to record the RAW pixel data in the recording medium 123 of the imaging apparatus 100.

As described above, even in the configuration in which the imaging apparatus 100 incorporates the recording medium 123 in which the RAW pixel data and the video data are recorded, the same effects as those of the imaging apparatus 100 according to the first embodiment can be obtained.

Combination of Embodiments

The embodiments described above can also be realized in combination. For example, in the second embodiment, the gain correction as in the first embodiment may be performed while different gamma correction is performed between the first recording mode and the second recording mode. In addition, in the second embodiment, the noise processing or the contour processing as in the third embodiment may be performed. In addition, in the configuration of the imaging apparatus 100 according to the fourth embodiment, it is possible to realize the same processing as that of the second and third embodiments.

Modification Example

The BT. 709 has been described as an example of the video standard of the video data, but the video standard of the video data is not limited to the BT. 709, and various video standards can be used.

At least the following matters are described in the present specification as described above.

(1)

A video control device comprising a storage unit that transitorily stores pixel data output from an imaging unit, a development processing unit that outputs video data obtained by performing development processing including demosaicing processing on the pixel data stored in the storage unit, and a mode switch control unit that switches between a first recording mode in which only the video data out of the video data and the pixel data stored in the storage unit is used as recording data and a second recording mode in which the video data and the pixel data stored in the storage unit are used as the recording data, and controls the imaging unit to perform imaging with different exposure values between the first recording mode and the second recording mode.

(2)

The video control device according to (1), in which the mode switch control unit controls an exposure value of the imaging in the second recording mode to be lower than an exposure value of the imaging in the first recording mode.

(3)

The video control device according to (1) or (2), in which the mode switch control unit controls the development processing to be different between the first recording mode and the second recording mode.

(4)

The video control device according to (3), in which the mode switch control unit controls image processing related to brightness to be different between the first recording mode and the second recording mode, the image processing being included in the development processing.

(5)

The video control device according to (4), in which the mode switch control unit controls an increase amount of brightness of the video data due to the image processing related to the brightness in the second recording mode to be larger than an increase amount of brightness of the video data due to the image processing related to the brightness in the first recording mode.

(6)

The video control device according to (4) or (5), in which the image processing related to the brightness includes gamma correction.

(7)

The video control device according to any one of (4) to (6), in which the image processing related to the brightness includes gain correction.

(8)

The video control device according to any one of (4) to (7), in which the image processing related to the brightness includes LUT processing.

(9)

The video control device according to any one of (1) to (8), in which the mode switch control unit controls the development processing unit to perform different noise processing on the pixel data between the first recording mode and the second recording mode.

(10)

The video control device according to any one of (1) to (9), in which the mode switch control unit controls the development processing unit to perform different contour processing on the pixel data between the first recording mode and the second recording mode.

(11)

The video control device according to any one of (1) to (10), comprising an output control unit that outputs the recording data.

(12)

A video recording device comprising the video control device according to any one of (1) to (10), and a recording unit that records the recording data.

(13)

A video control method of a video control device including a storage unit that transitorily stores pixel data output from an imaging unit, the method comprising outputting video data obtained by performing development processing including demosaicing processing on the pixel data stored in the storage unit, and switching between a first recording mode in which only the video data out of the video data and the pixel data stored in the storage unit is used as recording data and a second recording mode in which the video data and the pixel data stored in the storage unit are used as the recording data, and controlling the imaging unit to perform imaging with different exposure values between the first recording mode and the second recording mode.

(14)

The video control method according to (13), in which an exposure value of the imaging in the second recording mode is controlled to be lower than an exposure value of the imaging in the first recording mode.

(15)

The video control method according to (13) or (14), in which the development processing is controlled to be different between the first recording mode and the second recording mode.

(16)

The video control method according to (15), in which image processing related to brightness is controlled to be different between the first recording mode and the second recording mode, the image processing being included in the development processing.

(17)

The video control method according to (16), in which an increase amount of brightness of the video data due to the image processing related to the brightness in the second recording mode is controlled to be larger than an increase amount of brightness of the video data due to the image processing related to the brightness in the first recording mode.

(18)

The video control method according to (16) or (17), in which the image processing related to the brightness includes gamma correction.

(19)

The video control method according to any one of (16) or (18), in which the image processing related to the brightness includes gain correction.

(20)

The video control method according to any one of (16) to (19), in which the image processing related to the brightness includes LUT processing.

(21)

The video control method according to any one of (13) to (20), in which noise processing included in the development processing is different between the first recording mode and the second recording mode.

(22)

The video control method according to any one of (13) to (21), in which contour processing included in the development processing is different between the first recording mode and the second recording mode.

(23)

The video control method according to any one of (13) to (22), comprising outputting the recording data.

(24)

A video recording method comprising recording the recording data in the video control method according to any one of (13) to (22).

(25)

A non-transitory computer readable recording medium storing a video control program of a video control device including a storage unit that transitorily stores pixel data output from an imaging unit, the program causing a processor of the video control device to execute a process comprising outputting video data obtained by performing development processing including demosaicing processing on the pixel data stored in the storage unit, and switching between a first recording mode in which only the video data out of the video data and the pixel data stored in the storage unit is used as recording data and a second recording mode in which the video data and the pixel data stored in the storage unit are used as the recording data, and controlling the imaging unit to perform imaging with different exposure values between the first recording mode and the second recording mode.

EXPLANATION OF REFERENCES

31, 61, 81: gamma characteristic
41, 42, 71, 91: signal value characteristic
43: subject reflectivity
100: imaging apparatus
101: imaging lens system
102: imaging element
103: ADC
104: imaging control unit
105: RAW correction unit
106: transitory storage unit
107: development processing unit
108: monitor

109: output control unit
110: external output I/F
119: imaging unit
120: external recording device
121: external input I/F
122: recording control unit
123: recording medium
124: internal output I/F
125: internal input I/F

What is claimed is:

1. A video control device comprising:
a transitory storage; and
a processor configured to:
control an imaging sensor to perform imaging with a second exposure value that is different from a first exposure value corresponding to the BT. 709;
temporarily store pixel data output from the imaging sensor in the transitory storage before development processing;
receive the pixel data, and generate video data by performing the development processing including demosaicing processing on the pixel data stored in the transitory storage; and
record both of the video data and the pixel data in a recording medium different from the transitory storage.

2. The video control device according to claim 1,
wherein the second exposure value is lower than the first exposure value.

3. The video control device according to claim 2,
wherein an image processing related to brightness is different between an imaging process corresponding to the second exposure value and an image processing corresponding to the first exposure corresponding to the BT. 709, and the image processing being included in the development processing.

4. The video control device according to claim 3,
wherein a mode switch control unit controls an increase amount of brightness of the video data due to the image processing related to the brightness to be larger than an increase amount of brightness of the video data due to the image processing related to the brightness corresponding to the BT. 709.

5. A video control method of a video control device including a transitory storage that temporarily stores pixel data output from an imaging sensor, the method comprising:
controlling the imaging sensor to perform imaging with a second exposure value that is different from a first exposure value corresponding to the BT. 709;
temporarily storing the pixel data output from the imaging sensor in the transitory storage before development processing;
receiving the pixel data and generating video data by performing the development processing including demosaicing processing on the pixel data stored in the transitory storage; and
recording both of the video data and the pixel data in a recording medium different from the transitory storage.

6. A non-transitory computer readable recording medium storing a video control program of a video control device including a transitory storage that temporarily stores pixel data output from an imaging sensor, the program causing a processor of the video control device to execute a process comprising:
controlling the imaging sensor to perform imaging with a second exposure value that is different from a first exposure value corresponding to the BT. 709;
temporarily storing the pixel data output from the imaging sensor in the transitory storage before development processing;
receiving the pixel data and generating video data by performing the development processing including demosaicing processing on the pixel data stored in the transitory storage; and
switching between a first recording mode in which only the video data out of the video data and the pixel data stored in the transitory storage is recorded in a recording medium different from the transitory storage and a second recording mode in which both of the video data and the pixel data stored in the transitory storage are recorded in the recording medium different from the transitory storage.

* * * * *